US011966240B2

(12) United States Patent
Chinthu et al.

(10) Patent No.: US 11,966,240 B2
(45) Date of Patent: Apr. 23, 2024

(54) LOW-DROPOUT VOLTAGE REGULATOR (LDO) HAVING OVERSHOOT/UNDERSHOOT CAPACITOR

(71) Applicant: GlobalFoundries U.S. Inc., Malta, NY (US)

(72) Inventors: Siva K. Chinthu, Bangalore (IN); Veerendranath P. Sundar, Ponda (IN)

(73) Assignee: GlobalFoundries U.S. Inc., Malta, NY (US)

( * ) Notice: Subject to any disclaimer, the term of this patent is extended or adjusted under 35 U.S.C. 154(b) by 66 days.

(21) Appl. No.: 17/517,714

(22) Filed: Nov. 3, 2021

(65) Prior Publication Data

US 2023/0137946 A1 May 4, 2023

(51) Int. Cl.
*G05F 1/569* (2006.01)
*G05F 1/575* (2006.01)

(52) U.S. Cl.
CPC .............. *G05F 1/569* (2013.01); *G05F 1/575* (2013.01)

(58) Field of Classification Search
CPC .......... G05F 1/569; G05F 1/575; G05F 1/571; G05F 1/573; G05F 1/5735; G05F 1/59; G05F 1/595; G05F 1/567
See application file for complete search history.

(56) References Cited

U.S. PATENT DOCUMENTS 7,088,082 B2 * 8/2006 Jung ......................... H03F 1/38 323/275
7,173,402 B2 2/2007 Chen et al.
7,453,249 B2 11/2008 Lenz et al.
9,122,289 B2 9/2015 Howes
2013/0200870 A1 8/2013 Pradhan
2020/0012302 A1 1/2020 Fiocchi et al.
2022/0137656 A1 * 5/2022 Vangara .................. G05F 1/565 323/280
2022/0147082 A1 * 5/2022 Melanson ............... G05F 1/565

OTHER PUBLICATIONS

Chen et al., "A Fast-Transient 500-mA Digitally Assisted Analog LDO With 30-μV/mA Load Regulation and 0.0073-ps FoM in 65-nm CMOS," IEEE Journal of Solid-State Circuits, vol. 56, No. 2, 2021, pp. 511-520.
Fan et al., "Fast-Transient Radiation-Hardened Low-Dropout Voltage Regulator for Space Applications," IEEE Transactions on Nuclear Science, vol. 68, No. 5, 2021, pp. 1094-1102.
Han et al., "A 340-nA-Quiescent 80-mA-Load 0.02-fs-FOM Active-Capacitor-Based Low-Dropout Regulator in Standard 0.18-μm CMOS," IEEE Solid-State Circuits Letters, vol. 4, 2021, pp. 125-128.
Hazucha et al., "Area-Efficient Linear Regulator With Ultra-Fast Load Regulation," IEEE Journal of Solid-State Circuits, vol. 40, No. 4, 2005, pp. 933-940.
Lin et al., "An Active-Frequency Compensation Scheme for CMOS Low-Dropout Regulators With Transient-Response Improvement," IEEE Transactions on Circuits and Systems-II: Express Briefs, vol. 55, No. 9, 2008, pp. 853-857.
Ming et al., "A Fast-Transient Low-Dropout Regulator With Current-Efficient Super Transconductance Cell and Dynamic Reference Control," IEEE Transactions on Circuits and Systems—I: Regular Papers, vol. 68, No. 6, 2021, pp. 2354-2367.

* cited by examiner

*Primary Examiner* — Nguyen Tran
(74) *Attorney, Agent, or Firm* — David Cain; Hoffman Warnick LLC

(57) ABSTRACT

An apparatus includes an amplifier, a pass transistor connected to a load and to an input of the amplifier, and a capacitor connected between the amplifier and the pass transistor.

20 Claims, 3 Drawing Sheets

LOW-DROPOUT VOLTAGE REGULATOR (LDO) HAVING OVERSHOOT/UNDERSHOOT CAPACITOR

BACKGROUND

Field of the Invention

The present disclosure relates to voltage regulators, and more specifically, to voltage regulators that experience overshoot and undershoot.

Description of Related Art

Voltage regulators are highly useful elements within integrated circuit devices that provide consistent, steady-state voltage despite current, voltage, and load, etc., fluctuations within other circuit elements. One particularly useful voltage regulator is what is referred to as a "low-dropout" voltage regulator (LDO).

Low-dropout regulators can regulate direct current (DC) output voltage even when the supply voltage is very close to the output voltage. Low dropout voltage regulators reduce switching noise (as no switching takes place), provide a smaller device size (as neither large inductors nor transformers are needed), and offer design simplicity because they only need to include a reference, amplifier, and pass transistor. However, such devices do dissipate power and generate heat.

Thus, low-dropout voltage regulators are noted for using a differential amplifier that outputs to the gate of a pass transistor (e.g., field effect transistor (FET)) that is commonly a metal oxide semiconductor (MOS) such as a p-type (PMOS) or n-type (NMOS) MOS device. The pass transistor is sometimes referred to as a power transistor because the source of the pass transistor is connected to the same voltage source as the differential amplifier and the drain of the pass transistor supplies steady-state voltage to a load. Some differences between LDO and non-LDO regulators is their schematic topology because instead of an emitter follower topology, low-dropout regulators use an open collector or open drain topology, where the transistor may be easily driven into saturation with the voltages available to the regulator. This allows the voltage drop from the unregulated voltage to the regulated voltage to be as low as (limited to) the saturation voltage across the transistor.

SUMMARY

According to one embodiment herein, an apparatus includes an amplifier, a pass transistor connected to a load and to an input of the amplifier, and a capacitor connected between the amplifier and the pass transistor.

According to another embodiment herein, an apparatus includes a differential amplifier, a pass transistor connected to a load and to an input of the amplifier, a capacitor array connected between the amplifier and the pass transistor, and a trimmer circuit connected to the capacitor array. The trimmer circuit includes components adapted to engage and disengage capacitors in the capacitor array.

According to an additional embodiment herein, a voltage regulator includes a differential amplifier, a pass transistor connected to a load and to an input of the amplifier, a capacitor array connected between the amplifier and the pass transistor, and a trimmer circuit connected to the capacitor array. The trimmer circuit includes transistors adapted to engage and disengage capacitors in the capacitor array according to process, temperature, and voltage (PVT) variations.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, low-dropout voltage regulators are noted for using a pass transistor as a power element. One issue that can occur with low-dropout voltage regulators is overshoot and undershoot which is due to load current variation. Overshoot reduces the reliability of the load circuit, while undershoots affects the functionality of the load circuit.

More specifically, a voltage regulator generally consistently supplies the steady-state voltage that it is configured to output or at least outputs voltage within a steady-state voltage range that an attached load can use without damage or performance loss. When a load is instantly applied to a low-dropout voltage regulator, the steady-state voltage being output by the low-dropout voltage regulator can temporarily fall because the gate-source voltage ($V_{gs}$) of the pass transistor does not increase instantly, resulting in temporarily decreased output. Conversely, when load is disconnected (removed) from the low-dropout voltage regulator, the gate-source voltage ($V_{gs}$) of the pass transistor does not decrease instantly, resulting in temporarily increased output (overshoot).

The terms "overshoot" and "undershoot" are used because during such temporary voltage events the voltages output by the low-dropout voltage regulator can move outside the steady-state voltage range that the load needs to stay within to prevent damage or performance loss. While undershoot may merely prevent the load from functioning properly, overshoot may supply so much excess voltage to the load that the components of the load can be damaged.

Such potentially component damaging (or functionality affecting) temporary voltage events are avoided with the structures disclosed herein. Specifically, with these structures the gate voltage of the pass transistor of a low-dropout voltage regulator is driven by a voltage pulse (according to the output voltage variation) through a capacitor. This helps to reduce the overshoots/undershoots during load variations that occur due to the changes of the gate-source voltage Vgs of the pass transistor.

In other words, apparatuses herein push or pull the pass transistor gate voltage according to the load variations through a capacitor. The use of a capacitor helps to reduce the overshoots/undershoots during load variations due to the adjustment of gate voltage of the pass transistor. In some embodiments that use a capacitor array and trimmer circuit, the capacitor is programmable to address the process, voltage, temperature (PVT) variations. Thus, structures herein push/pull the gate voltage of the pass transistor using a capacitor driven by control circuitry that tracks the load variations along with an optional trimmer circuit that tunes the capacitor to address the PVT variations.

Figure 1:
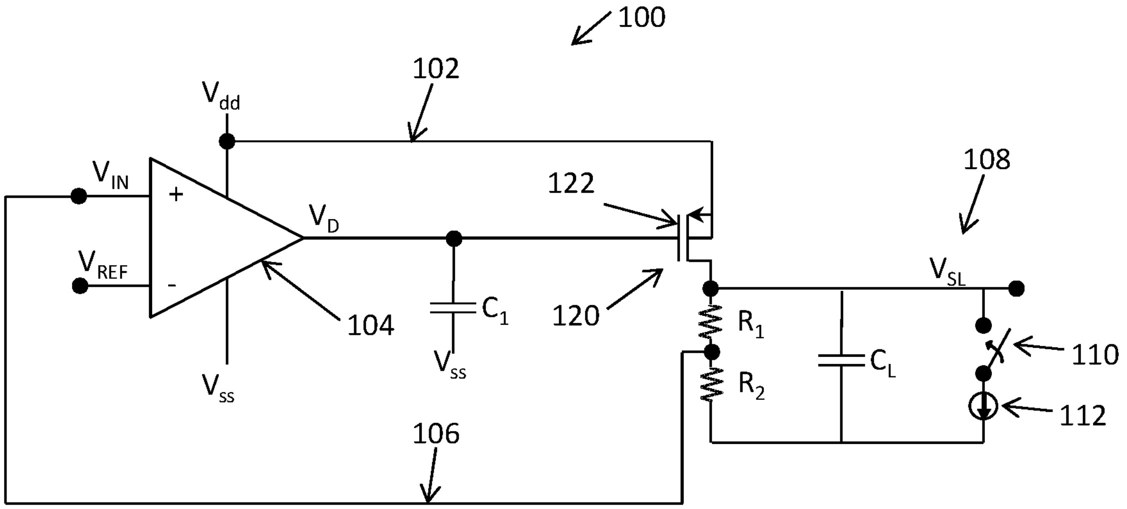
FIGS. 1-3 are schematic diagrams illustrating different examples of low-dropout voltage regulators according to embodiments herein.

FIG. 1 illustrates one exemplary embodiment herein that is an apparatus 100 (e.g., voltage regulator, such as a low-dropout voltage regulator (LDO)) that includes (among other components) a differential amplifier 104, a capacitor $C_1$ connected to an output $V_D$ of the differential amplifier 104, and a pass transistor 120 (e.g., P-type or N-type metal oxide semiconductor field effect transistor (MOSFET, or PMOS, NMOS, etc.)). Conductor 102 connects the input of the pass transistor 120 to a voltage source $V_{DD}$. Output voltage $V_D$ is connected to the gate 122 of the pass transistor 120 to control whether the pass transistor 120 supplies the power from the voltage source $V_{DD}$ to a load 108.

As shown in FIG. 1, an input $V_{IN}$ of the differential amplifier 104 is connected between a first resistor $R_1$ (receiving output from the pass transistor 120) and a second resistor $R_2$, (that is in series with the first resistor $R_1$) by way of a feedback conductor 106. A current source 112 is in series with a switch 110 that is used to turn the current from the current 112 on and off. In FIG. 1, capacitor $C_L$ represents the capacitance of the load and voltage $V_{SL}$ is the voltage supplied to the load 108 by the voltage regulator 100.

One input $V_{IN}$ of the differential amplifier 104 monitors the fraction of the output determined by the resistor ratio of $R_1$, and $R_2$. The second input $V_{REF}$, to the differential amplifier 104 is from a stable voltage reference (i.e., bandgap reference). If the supplied voltage $V_{SL}$ rises too high relative to the reference voltage $V_{REF}$, the drive to the pass transistor 120 changes to maintain a constant supplied voltage $V_{SL}$.

As noted above, sudden current changes caused by on or off transitions of the switch 110 can result in the voltage regulator 100 overshooting (when the switch 110 is turned off) or undershooting (when the switch 110 is turned on) the desired constant voltage supply $V_{SL}$ of the voltage regulator 100. However, with structures herein the presence of the capacitor $C_1$ buffers the voltage supplied to the gate 122 of the pass transistor 120, and this reduces the sudden voltage changes that the gate 122 of the pass transistor 120 can experience, which prevents or reduces overshoot and undershoot.

More specifically, in the structure shown in FIG. 1, the capacitor $C_1$ is connected to the gate 122 of the pass transistor 120 in a configuration such that the capacitor $C_1$ is connected to a net (conductor) between the output $V_D$ of the differential amplifier 104 and the gate 122 of the pass transistor 120. Additionally, the capacitor $C_1$ is sized to accommodate the charge required to push/pull the differential amplifier 104 output $V_D$.

In operations, when the load current 112 switches from no-load to full-load, the output voltage $V_{SL}$ of the voltage regulator 100 starts dropping (which could cause undershoot); however, because these structures include the buffering capacitor $C_1$, the capacitor's bottom plate is pulled down which causes the voltage of the gate 122 of the pass transistor 120 to drop and the gate-source voltage ($V_{gs}$) to increase, and this results in the pass transistor 120 supplying more current, with the result being that the potential undershoot decreases. In contrast, when load current switches from full-load to no-load, the output voltage $V_{SL}$ of the voltage regulator 100 starts rising (which could cause overshoot); however, because these structures include the capacitor $C_1$, the capacitor's bottom plate is pulled up which causes the voltage of the gate 122 of the pass transistor 120 to rise and the gate-source voltage ($V_{gs}$) to decrease, and this results in the pass transistor 120 supplying less current, causing the undershoot to decrease.

Once again, overshoot and undershoot are temporary voltage events where the voltage $V_{SL}$ output by the low-dropout voltage regulator 100 moves outsides the steady-state voltage range that the load 108 can accept without damage or performance loss. By keeping the voltage $V_{SL}$ output by the low-dropout voltage regulator 100 within the steady-state voltage range that the load 108 uses without damage or performance loss, the structures herein can completely eliminate overshoot and undershoot. In some implementations, even if the voltage $V_{SL}$ output by the low-dropout voltage regulator 100 goes outside the steady-state voltage range, such excesses are greatly minimized by the structures herein.

Additionally, these structures produce faster voltage response. Specifically, there is a time lag between when the differential amplifier 104 senses a difference between the inputs $V_{IN}$, $V_{REF}$ and when the differential amplifier 104 changes the output voltage $V_D$. The capacitor $C_1$ reduces this time lag by storing charge. Specifically, output $V_D$ from the differential amplifier 104 only needs to add to or subtract from the stored charge within the capacitor $C_1$ that already exists at the gate 122 of the pass transistor 120 in order to effect a change in the output $V_{SL}$ of the low-dropout voltage regulator 100, which reduces the time that the low-dropout voltage regulator 100 takes to respond to change. Therefore, the structures herein eliminate or reduce overshoot and undershoot and allow the low-dropout voltage regulator 100 to produce a faster response.

Figure 2:
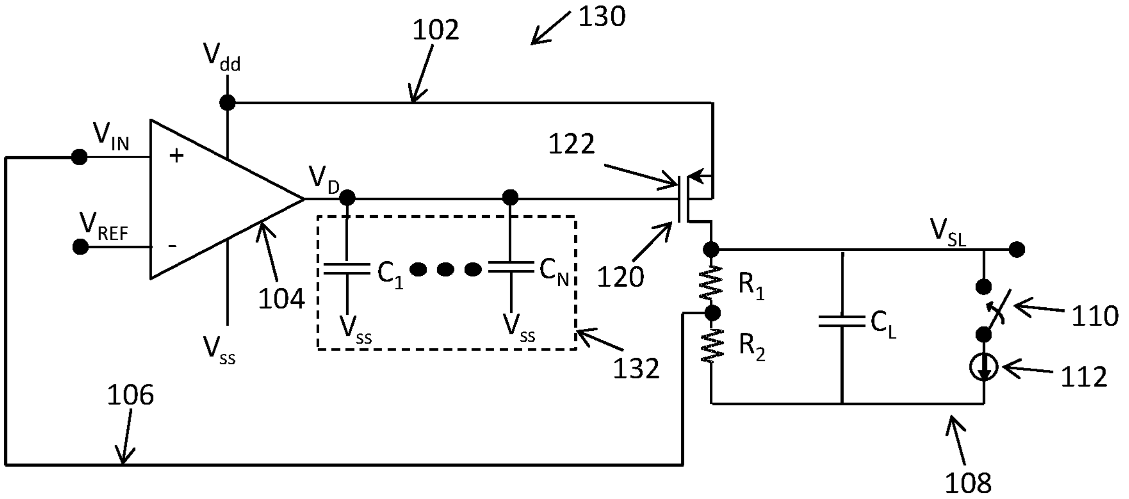

FIG. 2 illustrates another exemplary embodiment herein that is similar to the structure shown in FIG. 1 (and the same identification symbols and numbers are used to represent the same components); however, in FIG. 2, with the low-dropout voltage regulator 130 the capacitor $C_1$ is included within a capacitor array 132. The capacitor array 132 includes a number of capacitors $C_1$-$C_N$ and can be tuned by selectively engaging one or more of the capacitors $C_1$-$C_N$. In some examples, the capacitors $C_1$-$C_N$ can all be the same size, while in other examples, different sized capacitors $C_1$-$C_N$ can be used to allow more granular capacitance adjustments. The capacitance can be adjusted to suite specific goals and to attain specific performance variations depending on the various loads to which the low-dropout voltage regulators 130 may be connected.

Figure 3:
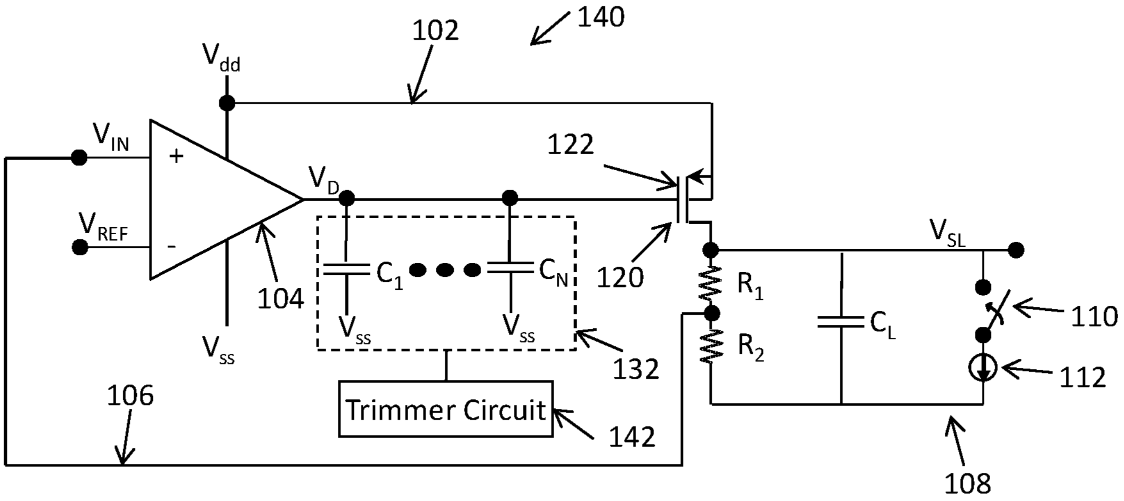

FIG. 3 illustrates a further exemplary embodiment herein that is similar to the structure shown in FIG. 2 (and the same identification symbols and numbers are used to represent the same components); however, in FIG. 3, the low-dropout voltage regulator 140 includes a trimmer circuit 142 that is used to selectively engage or disengage one or more of the capacitors $C_1$-$C_N$ within the capacitor array 132. The trimmer circuit 142 can include controllers, switches, sensors, etc., that can be used to (permanently, constantly, or periodically) engage and disengage one or more of the capacitors $C_1$-$C_N$ so as to (potentially) constantly adjust the overall capacitance of the capacitor array 132.

Figure 4:
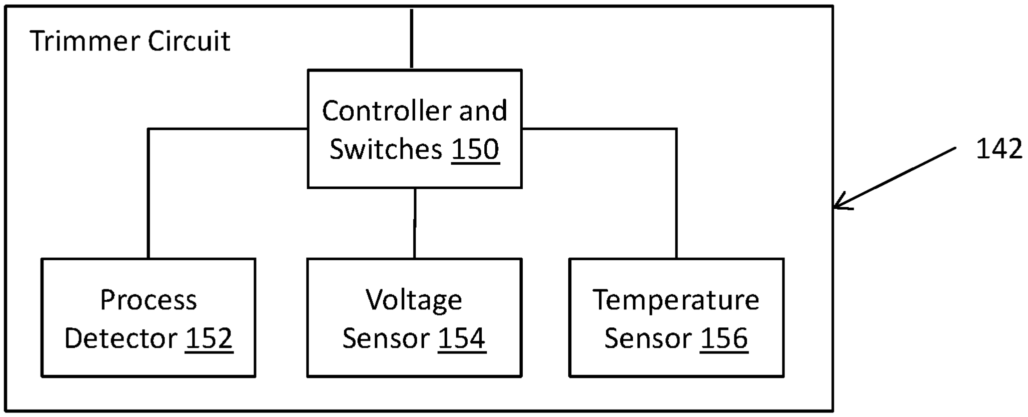
FIG. 4 is a schematic diagram illustrating a trimmer circuit according to embodiments herein.

FIG. 4 conceptually illustrates one non-limiting example of how the trimmer circuit 142 could be structured. As shown in FIG. 4, the trimmer circuit 142 can include various controllers and switches 150 (e.g., processors, transistors, logic, etc.) that execute logic to selectively connect or disconnect one or more of the capacitors $C_1$-$C_N$ from the output $V_D$ of the amplifier 104 and the gate 122 of the pass transistor 120.

In the example shown in FIG. 4, the controller/switches 150 can adjust which capacitors $C_1$-$C_N$ are engaged according to process, voltage, temperature (PVT) values. In order to accomplish this, the specific trimmer circuit 142 presented in this example includes a process detector 152, a voltage sensor 154, and a temperature sensor 156. The voltage sensor 154 can measure the voltage at many points of interest within the low-dropout voltage regulator 140 and, similarly, the temperature sensor 156 can measure the temperature at many points of interest within or around the low-dropout voltage regulator 140.

The process detector 152 shown in FIG. 4 detects and/or stores manufacturing process variations information about each different capacitor $C_1$-$C_N$ and the low-dropout voltage regulator 140. In some examples, even identically sized capacitors may have slightly different characteristics (capacitance, etc.). The process detector 152 can be programmed when manufactured for a specific manufacturing process variant of capacitors $C_1$-$C_N$ or the process detector 152 can initially, periodically, or constantly automatically detect the manufacturing process variant of the capacitors $C_1$-$C_N$ by running various initialization performance tests on the capacitors $C_1$-$C_N$, after which the process detector 152 stores the manufacturing process variant information of the capacitors $C_1$-$C_N$ for future use by controller and switches 150.

Figure 5:
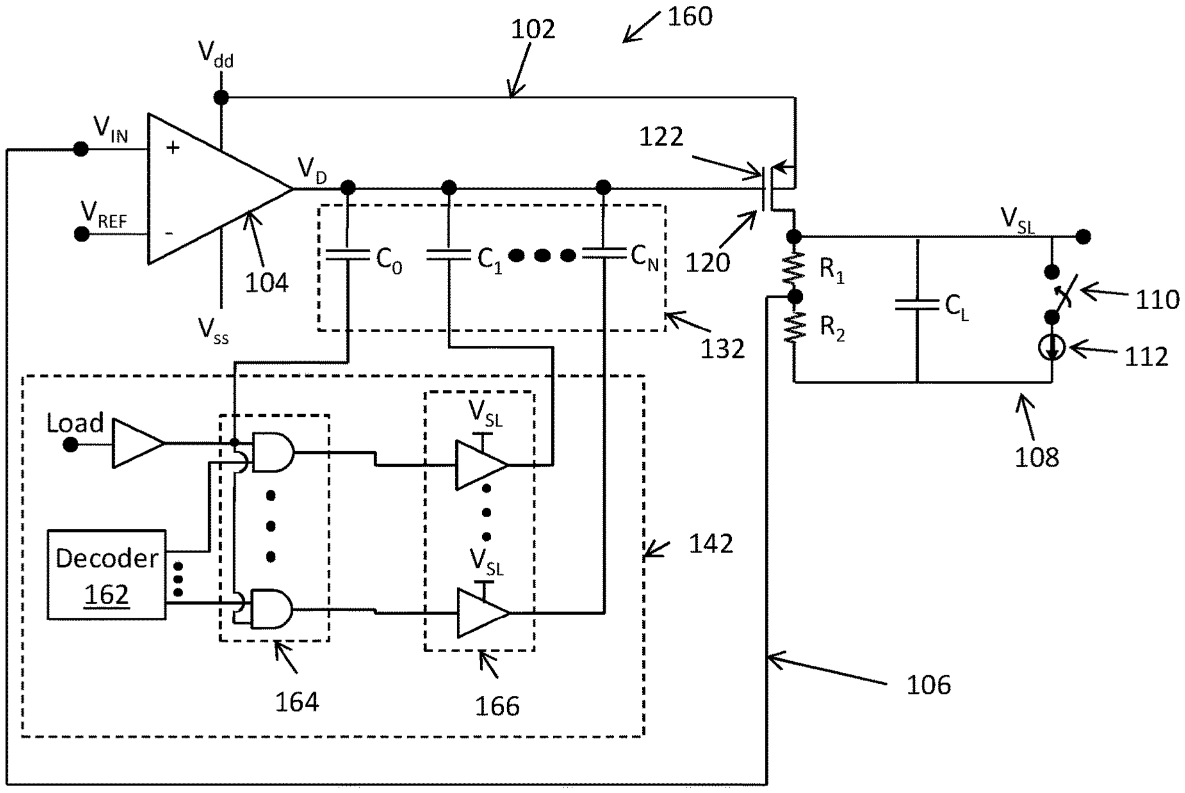
FIG. 5 is a schematic diagram illustrating one implementation of a low-dropout voltage regulator with a detailed trimmer circuit according to embodiments herein.

FIG. 5 illustrates one implementation of a low-dropout voltage regulator 160 with a detailed trimmer circuit according to embodiments herein. Specifically, FIG. 5 is again similar to the structure shown in FIG. 3 (and the same identification symbols and numbers are used to represent the same components); however, in FIG. 5 a specific implementation of the trimmer circuit 142 shows that the trimmer circuit 142 can include (as switches of item 150 in FIG. 4) an array of AND gates 164 and an array of buffers 166 (e.g., CMOS buffers).

Specifically, a decoder 162 in FIG. 5 (as controller of item 150 in FIG. 4) receives coded signals from a source and engages or disengages selected ones of the capacitors $C_0$-$C_N$ within the capacitor array 132 by supplying signals to the AND gate array 164. The decoder 162 can, for example, receive the coded signals for engaging/disengaging ones of capacitors $C_0$-$C_N$ as one-time capacitor setting at time of manufacture or the decoder 162 can receive the coded signals continuously/periodically from the PVT detectors/sensors 152, 154, 156 described above. Therefore, FIG. 5 illustrates that, while the top plates of the capacitors $C_0$-$C_N$ are connected to a net between the output of the differential amplifier $V_D$ and the gate 122 of the pass transistor 122, the bottom plates of the capacitors $C_0$-$C_N$ are connected to control logic 162 through inverter buffers 166. Again, this merely one exemplary structure for implementing the trimmer circuit 142 and the claims presented below are intended to capture all variants of the concept shown in the accompanying drawings.

There are various types of transistors, which have slight differences in how they are used in a circuit. For example, a bipolar transistor has terminals labeled base, collector, and emitter. A small current at the base terminal (that is, flowing between the base and the emitter) can control, or switch, a much larger current between the collector and emitter terminals. Another example is a field-effect transistor, which has terminals labeled gate, source, and drain/collector. A voltage at the gate can control a current between source and drain/collector. Within such transistors, a semiconductor (channel region) is positioned between the conductive source region and the similarly conductive drain/collector (or conductive source/emitter regions), and when the semiconductor is in a conductive state, the semiconductor allows electrical current to flow between the source and drain/collector, or collector and emitter. The gate is a conductive element that is electrically separated from the semiconductor by a "gate oxide" (which is an insulator); and current/voltage within the gate changes makes the channel region conductive, allowing electrical current to flow between the source and drain/collector. Similarly, current flowing between the base and the emitter makes the semiconductor conductive, allowing current to flow between the collector and emitter.

A positive-type transistor "P-type transistor" uses impurities such as boron, aluminum or gallium, etc., within an intrinsic semiconductor substrate (to create deficiencies of valence electrons) as a semiconductor region. Similarly, an "N-type transistor" is a negative-type transistor that uses impurities such as antimony, arsenic or phosphorous, etc., within an intrinsic semiconductor substrate (to create excessive valence electrons) as a semiconductor region.

While only one or a limited number of transistors are illustrated in the drawings, those ordinarily skilled in the art would understand that many different types transistor could be simultaneously formed with the embodiment herein and the drawings are intended to show simultaneous formation of multiple different types of transistors; however, the drawings have been simplified to only show a limited number of transistors for clarity and to allow the reader to more easily recognize the different features illustrated. This not intended to limit this disclosure because, as would be understood by those ordinarily skilled in the art, this disclosure is applicable to structures that include many of each type of transistor shown in the drawings.

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The description of the present embodiments has been presented for purposes of illustration and description but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. An apparatus comprising:

an amplifier;

a pass transistor connected to a load and an input of the amplifier;

a capacitor array connected between the amplifier and the pass transistor, the capacitor array including a plurality of capacitors, and a trimmer circuit connected to the capacitor array, wherein the trimmer circuit is configured to selectively engage and disengage the plurality of capacitors in the capacitor array, wherein the trimmer circuit includes:

a decoder; and a switch array including a plurality of switches, wherein the switches include AND gates, wherein a first input of each of the plurality of switches in the switch array is coupled to receive a same load-dependent first input signal and a second input of each of the plurality of switches in the switch array is coupled to the decoder to receive a corresponding second input signal, and wherein an output of each of the plurality of switches in the switch array is coupled to a respective capacitor in the capacitor array.

2. The apparatus of claim 1, wherein the plurality of capacitors in the capacitor array are connected to a gate of the pass transistor, and wherein the plurality of capacitors in the capacitor array are connected between an output of the amplifier and the gate of the pass transistor.

3. The apparatus according to claim 1, further comprising a process detector, a voltage sensor, and a temperature sensor for providing process, voltage, and temperature values, respectively, to the decoder, wherein the decoder outputs a signal to the plurality of switches in the switch array to selectively engage and disengage each of the plurality of capacitors in the capacitor array based on the process, voltage, and temperature values.

4. The apparatus according to claim 1, wherein the plurality of capacitors in the capacitor array are sized to accommodate a charge equal to a required output of the amplifier.

5. The apparatus of claim 1, further comprising a resistor connected to the pass transistor and an input of the amplifier.

6. The apparatus according to claim 1, wherein the amplifier, the plurality of capacitors in the capacitor array, the pass transistor, and the trimmer circuit are connected to form a low-dropout voltage regulator.

7. The apparatus according to claim 1, wherein the plurality of capacitors in the capacitor array buffer voltage supplied to a gate of the pass transistor.

8. An apparatus comprising:

a differential amplifier;

a pass transistor connected to a load and an input of the differential amplifier;

a capacitor array connected between the differential amplifier and the pass transistor, the capacitor array including a plurality of capacitors; and a trimmer circuit connected to the capacitor array, wherein the trimmer circuit is configured to engage and disengage the plurality of capacitors in the capacitor array, and wherein the trimmer circuit includes:

a decoder; and a switch array including a plurality of switches, wherein the switches include AND gates, wherein a first input of each of the plurality of switches in the switch array is coupled to receive a same load-dependent first input signal and a second input of each of the plurality of switches in the switch array is coupled to the decoder to receive a corresponding second input signal, and wherein an output of each of the plurality of switches in the switch array is coupled to a respective capacitor in the capacitor array.

9. The apparatus according to claim 8, wherein the plurality of capacitors in the capacitor array are connected to a gate of the pass transistor, and wherein the plurality of capacitors in the capacitor array are connected between an output of the differential amplifier and the gate of the pass transistor.

10. The apparatus according to claim 8, further comprising a process detector, a voltage sensor, and a temperature sensor for providing process, voltage, and temperature values, respectively, to the decoder, wherein the decoder outputs a signal to the plurality of switches in the switch array to selectively engage and disengage each of the plurality of capacitors in the capacitor array based on the process, voltage, and temperature values.

11. The apparatus according to claim 8, wherein the plurality of capacitors in the capacitor array are sized to accommodate a charge equal to a required output of the differential amplifier.

12. The apparatus according to claim 8, further comprising a resistor connected to the pass transistor and an input of the differential amplifier.

13. The apparatus according to claim 8, wherein the differential amplifier, the plurality of capacitors in the capacitor array, the trimmer circuit, and the pass transistor are connected to form a low-dropout voltage regulator.

14. The apparatus according to claim 8, wherein the plurality of capacitors in the capacitor array buffer voltage supplied to a gate of the pass transistor.

15. A voltage regulator comprising:

a differential amplifier;

a pass transistor connected to an external load and an input of the differential amplifier;

a capacitor array connected between the differential amplifier and the pass transistor the capacitor array including a plurality of capacitors; and a trimmer circuit connected to the capacitor array, wherein the trimmer circuit is configured to engage and disengage the plurality of capacitors in the capacitor array according to process, temperature, and voltage (PVT) variations, and wherein the trimmer circuit includes:

a decoder; and a switch array including a plurality of switches, wherein the switches include AND gates, wherein a first input of each of the plurality of switches in the switch array is coupled to receive a same load-dependent first input signal and a second input of each of the plurality of switches in the switch array is coupled to the decoder to receive a corresponding second input signal, and wherein an output of each of the plurality of switches in the switch array is coupled to a respective capacitor in the capacitor array.

16. The voltage regulator according to claim 15, wherein the plurality of capacitors in the capacitor array are connected to a gate of the pass transistor, and wherein the plurality of capacitors in the capacitor array are connected between an output of the differential amplifier and the gate of the pass transistor.

17. The voltage regulator according to claim 15, further comprising a process detector, a voltage sensor, and a temperature sensor for providing process, voltage, and temperature values, respectively, to the decoder, wherein the decoder outputs a signal to each of the plurality of switches in the switch array to selectively engage and disengage the plurality of capacitors in the capacitor array based on the process, voltage, and temperature values.

18. The voltage regulator according to claim 15, wherein the plurality of capacitors in the capacitor array are sized to accommodate a charge equal to a required output of the differential amplifier.

19. The voltage regulator according to claim 15, further comprising a resistor connected to the pass transistor and an input of the differential amplifier.

20. The voltage regulator according to claim 15, wherein the differential amplifier, the plurality of capacitors in the capacitor array, the trimmer circuit, and the pass transistor are connected to form a low-dropout voltage regulator.

* * * * *